Figure 4:
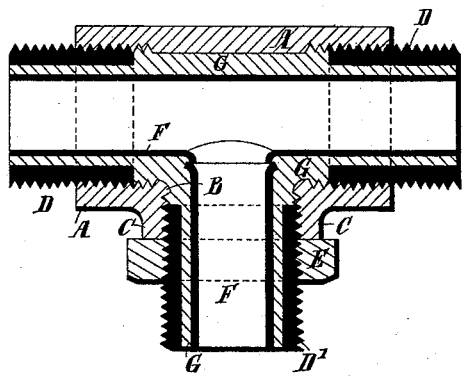

(No Model.) 4 Sheets—Sheet 1.
D. RYLANDS, J. CROWDER & R. MORANT.
METHOD OF MANUFACTURING GLASS LINED PIPE FITTINGS.
No. 430,041. Patented June 10, 1890.
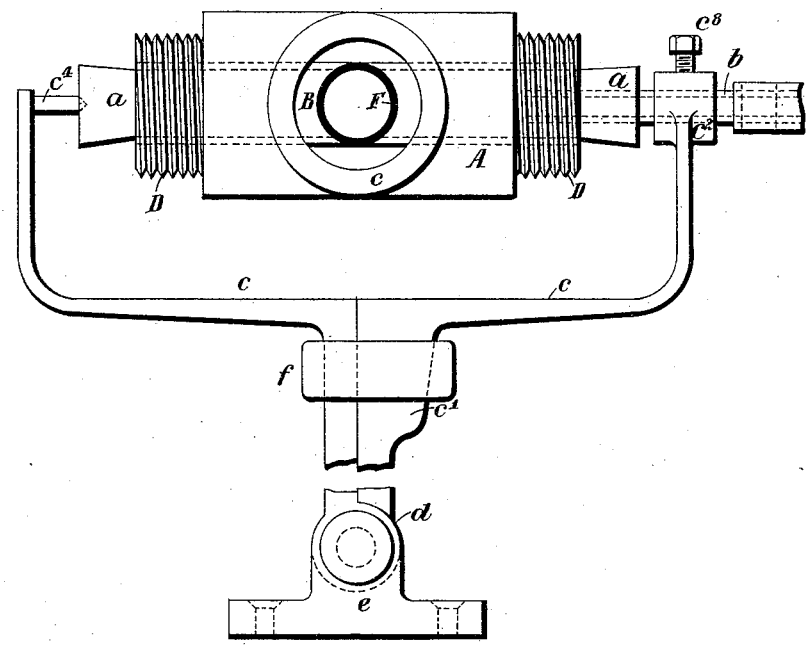
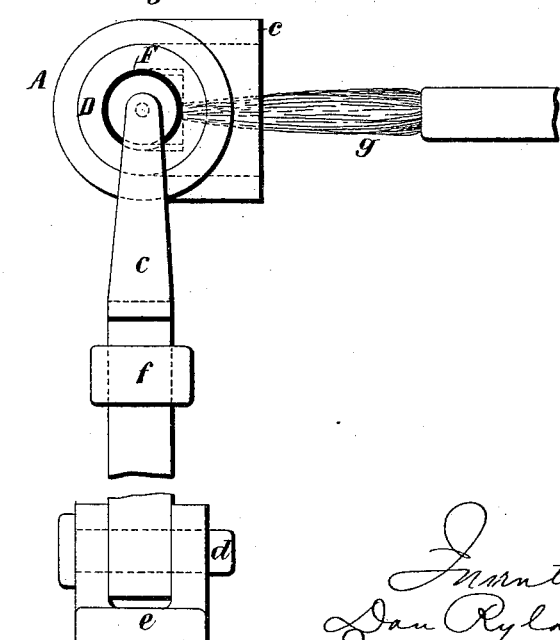

(No Model.) 4 Sheets—Sheet 2.
D. RYLANDS, J. CROWDER & R. MORANT.
METHOD OF MANUFACTURING GLASS LINED PIPE FITTINGS.
No. 430,041. Patented June 10, 1890.
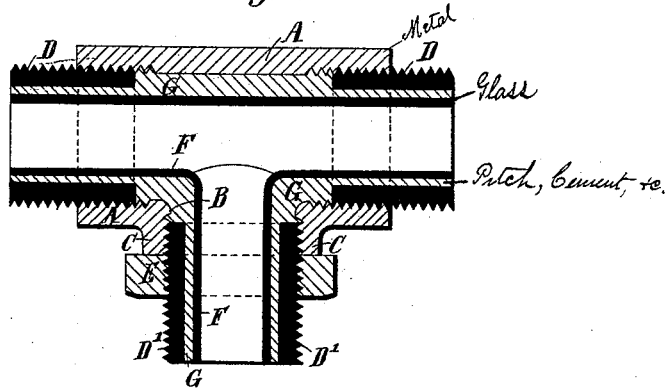
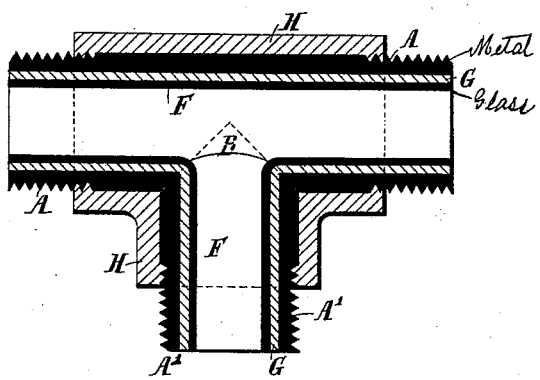
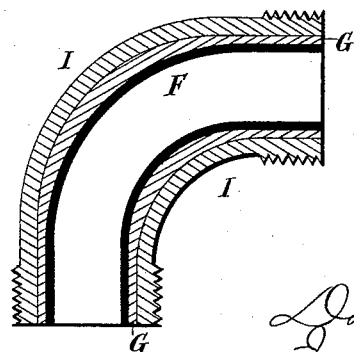

(No Model.) 4 Sheets—Sheet 3.
D. RYLANDS, J. CROWDER & R. MORANT.
METHOD OF MANUFACTURING GLASS LINED PIPE FITTINGS.

No. 430,041. Patented June 10, 1890.

(No Model.) 4 Sheets—Sheet 4.
D. RYLANDS, J. CROWDER & R. MORANT.
METHOD OF MANUFACTURING GLASS LINED PIPE FITTINGS.
No. 430,041. Patented June 10, 1890.

UNITED STATES PATENT OFFICE.

DAN RYLANDS, JAMES CROWDER, AND ROBERT MORANT, OF BARNSLEY, ENGLAND; SAID CROWDER AND MORANT ASSIGNORS TO SAID RYLANDS.

METHOD OF MANUFACTURING GLASS-LINED PIPE-FITTINGS.

SPECIFICATION forming part of Letters Patent No. 430,041, dated June 10, 1890.

Application filed February 5, 1890. Serial No. 339,274. (No model.)

*To all whom it may concern:*

Be it known that we, DAN RYLANDS, glass manufacturer; JAMES CROWDER, flint-glass blower, and ROBERT MORANT, mechanical engineer, subjects of the Queen of Great Britain, and residents of Barnsley, England, have invented certain new and useful Improvements in or relating to Glass-Lined Fittings for Glass-Lined Tubing, of which the following is a specification, reference being had to the accompanying drawings.

Our invention relates to the manufacture of glass-lined fittings for glass-lined tubing, and more especially to the construction of glass-lined T-pieces and elbows or bends.

By our invention we are enabled to construct, in a convenient and efficient manner, a T-piece with a perfectly-continuous glass lining—that is to say, a lining in which the glass tube forming the stem of the T is perfectly welded to the glass tube forming the head or cross-piece of the T. In some cases we prefer not to weld together the two parts forming the T-shaped lining, but simply to allow the end of the piece forming the stem to abut against the turned-up edge of the opening formed in the cross-piece or cross-tube; or we may expand the end of the stem-piece so that it extends over the turned-up edge of the aforesaid opening and forms a cap therefor; or we hollow out the end of the stem so that it will bed on the cross-tube, and, if desired, we turn up the edge of the opening inside the stem. We so construct the parts that the internal diameter of the metal T-piece or casing is somewhat greater than the external diameter of the glass lining, and the space between the metal and the lining we fill with pitch, cement, asbestus, or other suitable material to hold the glass lining firmly in position and form a solid compact fitting. When the glass tubes are welded or united, the glass lining is obviously water-tight throughout. In the other modifications the lining itself is not water-tight at the junction of the tubes, and in these cases the integrity of the pipe-fitting is secured by the packing of pitch, cement, asbestus, or other material hereinbefore referred to. In those cases where the said lining is not solid or continuous throughout it is desirable to employ a packing material that will not be readily dissolved or washed out by the action of the water or other fluid in the pipe, and for this reason we prefer in such cases to use pitch for supporting the lining.

The metal shell or casing of the pipe-fitting is constructed of an ordinary piece of iron, brass, or other piping, forming the head or cross-piece with or without nipples at the ends, in which is formed about midway between its ends a screw-threaded hole for the reception of the screwed end of another piece of piping or a nipple forming the stem of the T. In cases where the stem is required to be of the same diameter as the cross piece or head it is necessary to strengthen the latter around the hole by means of a boss. This boss, however, must be as short as possible consistent with strength to enable the operator to see his work clearly when fusing the portions of the glass lining together. We may insure additional security to the nipple forming the stem by providing it with a lock-nut, which on being screwed down on the aforementioned boss will effectually hold the stem in position and prevent its becoming loosened by knocks or vibrations. The stem-piece, instead of being screwed into the head, is sometimes merely formed to fit in or on the latter, and after the glass lining has been formed in position the whole is placed in a suitable mold and molten iron, white-metal, brass, or other suitable metal is run over it, forming a cast-casing enveloping the pieces of the T-fitting and securely holding them together by its shrinkage.

In applying our invention to elbows or bends we form the glass lining to the desired curvature, and to admit of its introduction into the metal casing we form the latter with a truly circular sweep or curvature throughout; or we construct one end of the said casing slightly oval, the longest axis of the oval being in the plane of curvature of the elbow or bend; or we make the casing of enlarged diameter at the bend. The lining may or may not be formed slightly smaller at one than at the other end. After the lining is inserted we fill the space between the same and the casing with suitable packing material, as in the case of T-fittings.

In the accompanying drawings we have shown how our said invention may be conveniently and advantageously carried into practice.

Figure 7:
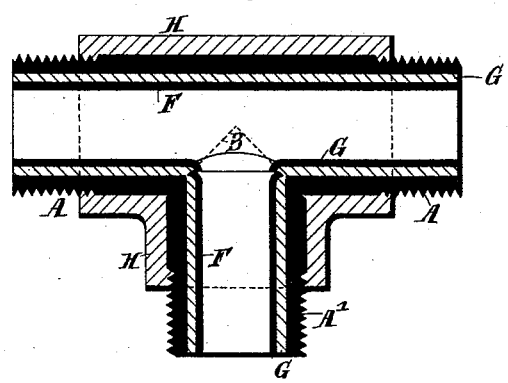
Figure 10:
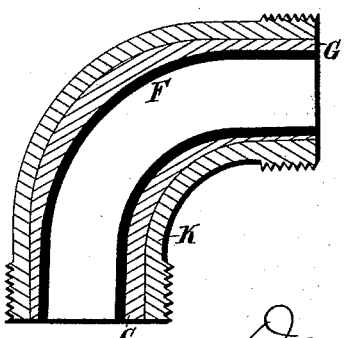
Figure 5:
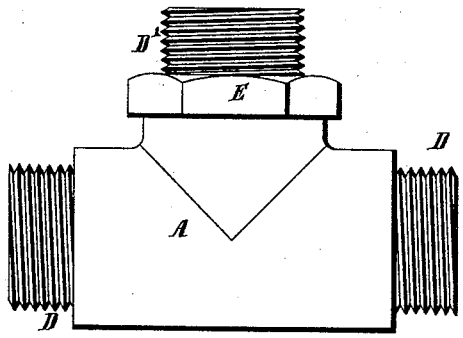
Figure 8:
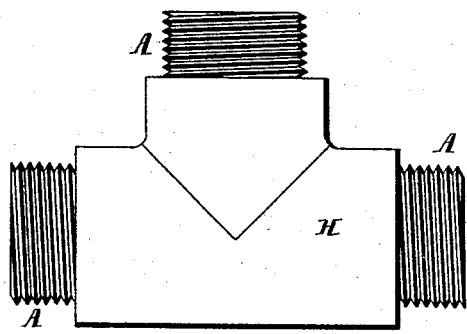
Figure 11:
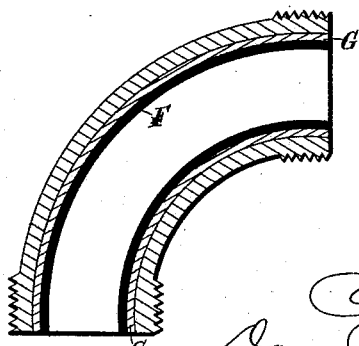

Figure 1 shows a portion of a T-piece suspended in a holder in such a manner that the operations of forming the aperture in the glass lining of the cross-piece and fusing the glass stem therein may be effected. Fig. 2 is an end elevation of the said T-piece and holder, showing, also, a blow-pipe flame impinging on the glass lining. Fig. 3 is a longitudinal central section of a T-piece constructed according to our said invention, and in which the glass lining is continuous throughout. Fig. 4 shows a T-piece wherein the glass lining is not continuous at the junction of the stem and cross-piece. Fig. 5 is a side elevation of the fitting represented in section in Fig. 3 or in Fig. 4. Fig. 6 is a longitudinal central section showing another form or modification of our improved T-piece, wherein the parts of the metal shell or casing are held together by an outer shell cast around them. Fig. 7 shows in longitudinal central section a T-fitting constructed like that shown in Fig. 6, but in which the glass lining is discontinuous at the junction of the stem and cross-piece. Fig. 8 is a side elevation of the fitting represented in section in Fig. 6 or in Fig. 7. Figs. 9, 10, and 11 show in longitudinal central section various forms of elbows or bends constructed according to our said invention.

Like letters indicate corresponding parts throughout the drawings.

Referring to Figs. 1 to 5, A is a metal tube screw-threaded internally at both ends and having a side opening B about midway between its ends strengthened by a shallow boss or branch pipe C. The said side opening B is also screw-threaded internally. The three ways thus formed are provided with nipples D D'. The boss or branch pipe C is made rather short to facilitate the inspection of the joint during the welding operation, hereinafter mentioned. To obviate liability to loosening of the nipple D' in the boss or branch pipe C by any shock or vibration to which the fitting may be subjected, a lock-nut E is screwed upon the said nipple until the said nut bears tightly against the boss C, thus more firmly securing the said nipple therein and preventing its accidental displacement. F is the glass lining, the three branches of which terminate flush with the faces of the three nipples D D', respectively. G is a packing of pitch, cement, asbestos, or other suitable material situated between the glass lining and the metal casing to hold the former securely in position.

In Fig. 3 the glass lining is shown continuous at the junction of the stem with the cross-piece, while in Fig. 4 it is shown discontinuous at the junction. In the latter case leakage is prevented by the packing G, which is of such a nature as to resist both the solvent action and the pressure of the water or other liquid in the fitting. The sections of the nipples and of the glass lining are shown black in the drawings to more clearly distinguish them from the other parts of the T-piece.

In order to form a glass T-shaped lining F within a fitting, such as that shown in Fig. 3, we find it advantageous to proceed as follows, viz: We pass a suitable straight glass tube through the casing and wedge it tightly in the bore by any convenient temporary packing. We then fit corks or plugs $a\ a$, Fig. 1, in the ends of the said glass tube, one of the said corks or plugs being bored through the center and fitted with a blow-tube $b$. The metal casing of the T-piece, without the branch nipple D' and lock-nut E, is then mounted in a holder consisting of arms $c\ c$, pivoted at $d$ to a bracket $e$, firmly secured to a bench or other convenient support. The arms $c$ are held together by a clip $f$, which is arranged to slide up and down upon the said arms, one of which is provided with a taper or inclined portion $c'$ to insure the forcible drawing together of the said arms when the clip $f$ is pushed upward thereon. One of the arms $c$ is provided with an eye $c^2$, through which is passed the blow-tube $b$, the said tube being secured therein by a set-screw $c^3$. The other arm $c$ has a center piece $c^4$ at its upper end, which, when the arms $c$ are forcibly drawn together by moving the clip $f$ upward over the incline $c'$, enters a short distance into the cork $a$ and securely retains the fitting in the holder. Instead of a single hinge-joint $d$, two hinge-joints arranged at right angles to each other or a ball-and-socket joint may be employed to give greater freedom to the movements of the arms $c$. Having thus secured the fitting in a movable holder, we direct a blow-pipe flame $g$, Fig. 2, through the opening B in the metal casing A, and thereby heat that portion of the glass tube immediately opposite the said opening sufficiently to allow of an aperture being formed in the said glass tube by blowing through the tube $b$. This aperture is worked in the usual manner into a circular hole having its edges turned outward, as shown by dotted lines in Fig. 2. We next take another piece of glass tube and insert it into the opening B, and by means of the blow-pipe flame $g$ we weld it to the edge of the circular opening, and thus form a T-shaped continuous glass lining inside the casing A. The fitting is then removed from the holder, the aforesaid temporary packing is taken out, the branch nipple D' and its lock-nut E are placed in position, and, the glass lining F being centralized, the packing material G is introduced and the fitting thus completed.

It is obvious that the circular opening in the glass tube may be formed in any ordinary or suitable manner before inserting the said tube in the metal casing, the bore of the casing being large enough to admit the tube even with the edge of the aperture turned up as shown in Fig. 2. Consequently with this mode of manufacture a much simpler holder will answer the purpose—for instance, a holder consisting simply of a pair of rings, having handles attached thereto, passed over the ends of the casing and held in the hand of the operator. With large fittings, too heavy to be thus held, the handles may be fixed in a stem pivoted by a universal joint to a bracket attached to the working-bench.

In Fig. 4 the arrangement shown is identical with that illustrated in Fig. 3, with the exception that the glass lining of the branch C is not welded to the cross-tube, but is merely flanged outward to fit on or over the turned-up edge of the circular opening in the said cross-tube. With this mode of construction the screw-threaded strengthening-boss or branch pipe C may, if desired, be lengthened, inasmuch as the operator does not require to examine the joint with minuteness, as is the case when a weld is to be effected. Consequently the nut E may be dispensed with. In other words, the casing A in this arrangement may be an ordinary T-fitting.

It is obvious that, if desired, the two nipples D in the head or cross-piece of the T-fitting may be dispensed with and the ends of the casing A be screw-threaded externally, instead of internally.

According to another modification of our invention we take a straight metal tube A, Fig. 6, and cut in it about midway between its ends a V or other shaped opening B, and we shape the end of a similar metal tube A' to fit in the said opening, so that when the two tubes are put together they form a T-piece, as shown. We form within the tube A a T-shaped glass lining F by either of the methods herein described, the stem of the T projecting through the opening B, formed in the side of the tube A. We then pass the prepared tube A' over the glass lining and fit it into the aperture B and place the whole within a suitable mold. Molten iron, white-metal, brass, or other suitable metal is then run into the mold to form around the T-fitting an outer shell H, which, on cooling, shrinks and firmly grips the two portions of the fitting and effectually holds them together, forming a compact T-piece. A packing of pitch or cement or other suitable material G, as above described with reference to Fig. 3, is then run in between the glass lining and the metal tubes A A', and the T-fitting is thus completed.

We have shown the ends of the tube A screw-threaded externally for coupling purposes. It is obvious, however, that the said tube might be provided with nipples like those shown in Fig. 3.

In Fig. 7 we have shown a T-fitting constructed like that illustrated by Fig. 6, with the exception that the two portions of the glass lining are not welded or fused together at the junction. In this case, as in that shown in Fig. 4, leakage is prevented by the packing G.

Although we have above described our invention with reference to the construction of ordinary T or three-way fittings, it will be well understood that a four-way or other multiple-way glass-lined fitting may be similarly manufactured by carrying out, with reference to two or more openings formed in the tube A, operations similar to those hereinabove described.

In adapting our invention to the manufacture of glass-lined elbows or bends we form the metal casing of such a shape that a previously-bent glass tube F, Figs. 9, 10, and 11, intended for the lining, may be inserted into the said casing previous to the introduction of the cement or other packing. With this object we may merely enlarge the casing at the bend, as shown at I in Fig. 9; or we may construct one end of the elbow of an oval section internally, as shown at K, Fig. 10, the major axis of the oval being in the plane of curvature of the elbow; or we may construct the elbow and lining with a truly-circular curvature throughout their entire length, as shown in Fig. 11. In the arrangement shown in Fig. 10 the circular end of the casing and the corresponding end of the lining may be slightly less than the other ends of the casing and lining, respectively. Having placed the glass lining within its metal casing, we fill up the space between the said lining and the casing with cement, asbestos, or other suitable material G, as in the case of T-fittings.

What we claim is—

1. The method of manufacturing glass-lined multiple-way pipe-fittings, which consists in inserting the several sections of glass tubing loosely into the metal piping, welding the said tubing together, and finally introducing a suitable packing between the glass and the metal, substantially as set forth.

2. The method of manufacturing glass-lined multiple-way pipe-fittings, which consists in inserting the several sections of glass tubing into the metal piping, and then uniting the said sections of glass tubing by means of a blow-pipe flame while held in their proper relative position within the metal piping, substantially as set forth.

3. The method of manufacturing glass-lined multiple-way pipe-fittings, which consists in inserting the several sections of glass tubing into the metal piping, and then uniting the said sections of glass tubing by means of a blow-pipe flame while held in their proper relative position within the metal piping, and finally introducing a suitable packing between the glass and the metal, substantially as and for the purpose set forth.

In testimony whereof we have hereunto signed our names in the presence of two subscribing witnesses.

DAN RYLANDS.
     JAMES CROWDER.
     ROBERT MORANT.

Witnesses:
 THOMAS JOHNSON,
 AARON BOSTWICK.